UNITED STATES PATENT OFFICE.

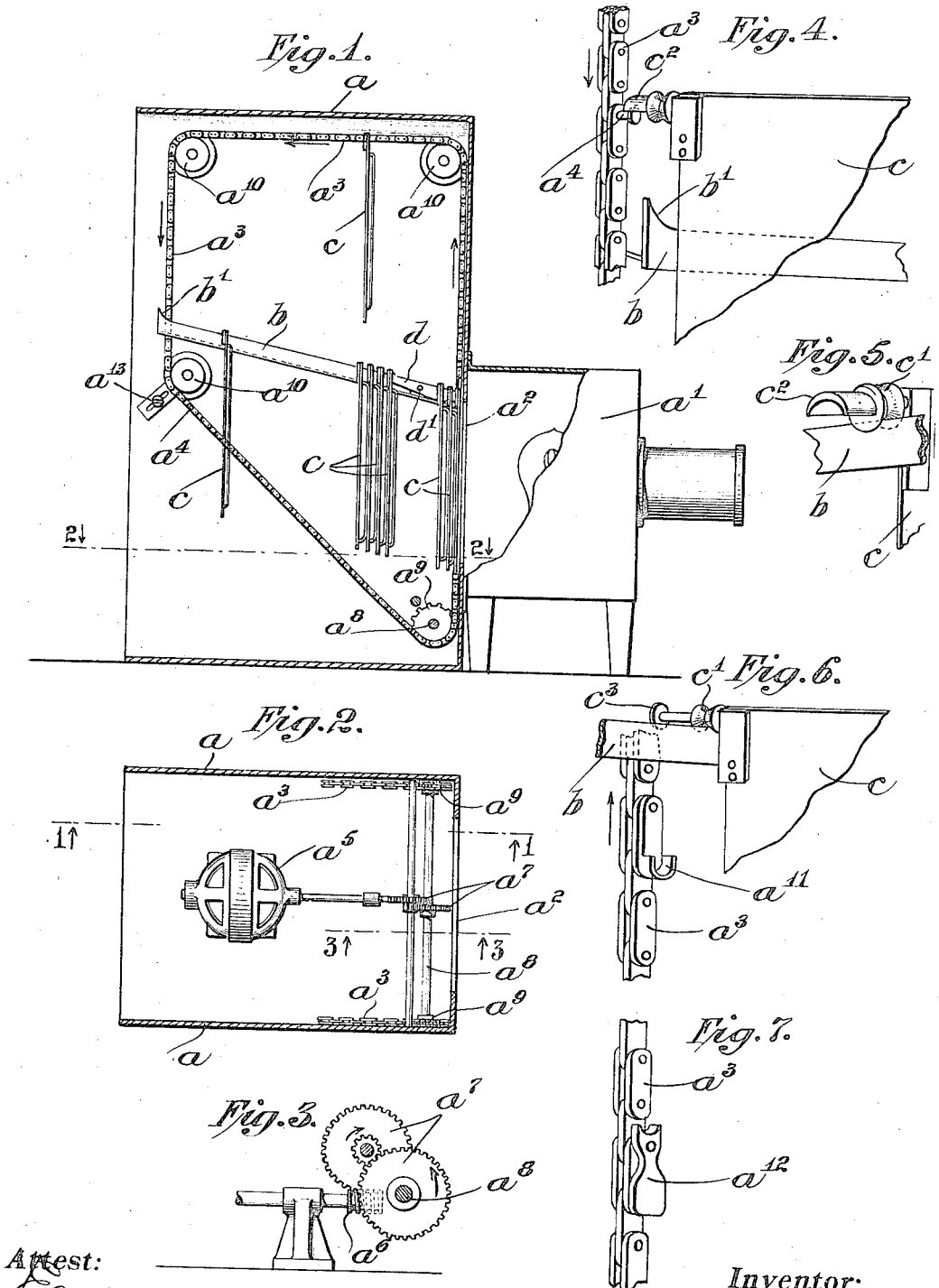

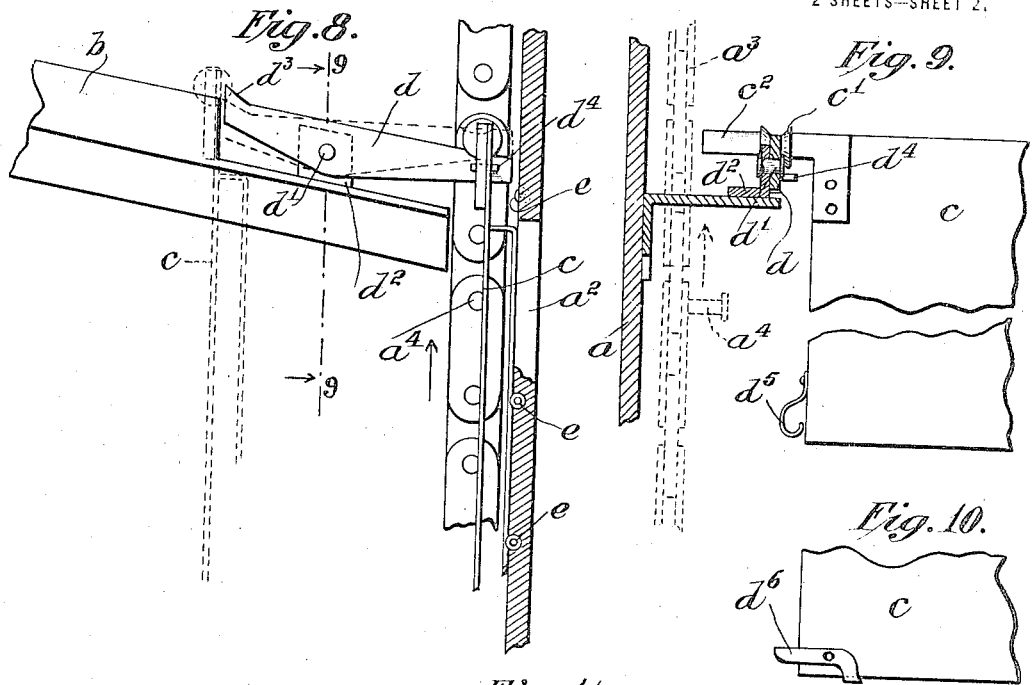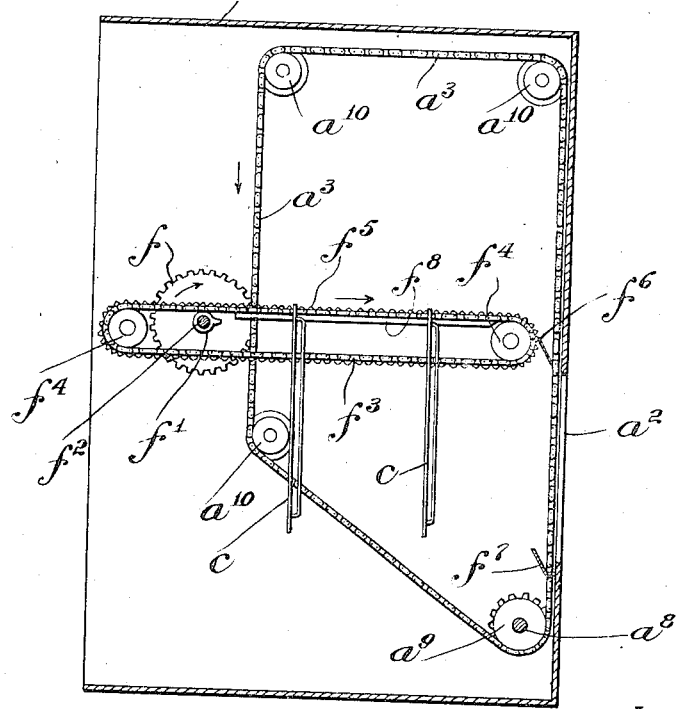

MANLY M. GILLAM, OF FLUSHING, NEW YORK.

PICTURE-PROJECTING DEVICE.

1,167,399.

Specification of Letters Patent.  Patented Jan. 11, 1916.

Application filed June 2, 1915. Serial No. 31,658.

*To all whom it may concern:*

Be it known that I, MANLY M. GILLAM, a citizen of the United States, residing in Flushing, Long Island, in the county of Queens and State of New York, have invented certain new and useful Improvements in Picture-Projecting Devices, of which the following is a specification.

My invention relates primarily to the class of picture projecting devices which is designed to project or present the pictures or images of opaque objects such as photographs, written or printed matter, paintings, engravings, woven fabrics, etc., on a screen or other suitable surface. In the intermittent presentation of the pictures or images of such opaque objects on a screen or other display surface, whether for advertising, amusement or educational purposes, where the picture or image is to remain in view for a limited time, the importance of some means for automatically and certainly substituting one picture or image for another without the continuous care and attention of an operator, is well understod by those familiar with the problems involved in the general proposition. I am aware that attempts have been made to solve this problem but I know of nothing that has proved in any degree broadly and practically successful and generally adaptable in this line. An ideally effective and generally available device of this character must be simple in construction proof against a considerable degree of carelessness and neglect, elastic in capacity, easy to operate, easy to make subject-changes in, positive in its important movements, certain to bring its picture-subjects into focus as required and capable of projecting the images or pictures of subjects that have not been specially prepared.

In combination with such intermittent picture presenting devices I have developed an invention that insures the automatic change of an instantly variable number of pictures or images on a display screen or surface with unfailing certainty and at the prearranged intervals of time, always placing the subject matter in focus when in operation and in general meeting the rigid requirements of a machine of this character suited to practical popular use. To accomplish this result I provide a plurality of subject-holders or carriers supported by projecting arms on a rack, preferably of two anteriorly inclined parallel members and with means for imparting motion to said subject-holders or carriers after they are in operative position on said rack. Each subject-holder or carrier is adapted to retain at the will of the director, a photograph, a picture, printed or written matter or other available object on one of its face surfaces, and, when in operation, to expose to the projecting light rays of the device the subject matter so retained by the anteriorly located subject-holder or carrier, in proper focus, for a predetermined period of time, then automatically removing this subject-holder or carrier from its anterior position on the said rack and causing it to take a position posterior to the other subject-holders or carriers then supported on the said rack, meantime the subject-holder or carrier first behind the one removed, as aforesaid, automatically, by gravity or otherwise, taking a position in focus for proper exposure to the projecting light rays, this proceedure continuing indefinitely, at the will of the director, one after another of the said subject-holders or carriers being automatically brought into sequential position for focused exposure to the projecting light rays so long as the device is in operation. The number of subject-holders or carriers may be instantly varied at will and changes in the number of them or in the matter whose picture or image is to be projected which any one of them supports, may be made as desired while the device is in operation and without interfering with its operative effectiveness.

With the object or matter to be shown on the display curtain or screen located posteriorly to the radiated or direct light rays of the projecting apparatus I prefer that the said subject-holders or carriers shall be taken from the focused position and placed in the posterior position as aforesaid by means of two endless chains, belts, bands or other conveyers moving in the same direction and parallel to each other. In the favored form of my device the course of the parallel chains, belts, bands or other conveyers is to the plane of the device perpendicular, horizontal and diagonal at different points of their progress while making a complete circuit from the point of actuation. These endless chains, belts, bands or other conveyers are given motion by any adequate source of power and by means of sprocket wheels or other effective provision are made to move synchronously. An arm or other suitable attachment is connected with each chain, belt, band or other conveyer in position to engage that part of the projecting arm of any subject-holder or carrier in focused position that appears on the side of said rack member next to said chain, belt, band or other conveyer, and, acting synchronously with the other chain, belt, band or other conveyer lift said subject-holder or carrier until while in a pendant position, supported by its projecting arms, it will freely clear all of the subject-holders or carriers then on the rack aforesaid. At that point I cause each chain, belt, band or other conveyer to take a course toward the rear of the apparatus by passing it over a wheel or pulley, sprocketed or otherwise, or by other suitable means and when they have carried the still pendant subject-holder or carrier to a point perpendicularly above the posterior portion of the said rack I cause each chain, belt, band or other conveyer, at the point supporting the arm of the said subject-holder or carrier to take a downward direction by passing it over a wheel or pulley, sprocketed or otherwise, or by other effective means. The pendant subject-holder or carrier, swinging on its points of support as aforesaid, continues to be influenced to hang perpendicularly and as the said chains, belts, bands or other conveyers move on their said circuit, it passes between the members of the said rack, while the chains, belts, bands or other conveyers pass each on the outside of that member of the said rack nearest it, the inevitable result being that the projecting arms of the said subject-holder or carrier are caught by the members of the said rack, the said subject-holder or carrier is arrested in its downward course with the chains, belts, bands or other conveyers, disengaged from the arms or other suitable devices that had previously engaged its projecting arms when in focused position, and left free to move forward on the said rack, by gravity, or otherwise, and take its place in a position posterior to any subject-holders or carriers then supported on the said rack, while the said arm or other suitable device on each said chain, belt, band or other conveyer proceeds on its circuit until in proper turn it again engages the projecting arm of a focused subject-holder or carrier and the above described process is repeated indefinitely, at the will of the director.

My preferred construction for the projecting arms attached to the chain, belt, band or other conveyer as aforesaid is to make each in the form of a stud or pin with the external extremity increased in diameter sufficient to constitute a head or enlargement adapted to loosely engage the lip-like edge of an inverted cup-like projection on the end of one of the projecting arms of the aforesaid subject-holder or carrier and guard against the possibility of disengagement therefrom by lateral slip.

There are other means that would also be effective for producing the lifting, carrying and depositing result aforesaid. In some instances it might even be preferable to have the pin-like projection apart of the projecting arm of the subject-holder or carrier, the cup-like device for engaging it swinging freely on a short arm attached to the said chain, belt, band or other conveyer and being influenced by gravity, or otherwise, to hang perpendicularly at all times. In still another form of construction for producing this result of transference I make the lifting device as attached to the said chain, belt, band or other conveyer somewhat fork-shape and influence it to maintain a perpendicular position, with its forked extremity uppermost, by means of a preponderance of weight below its point of pivotal attachment to the said chain, belt, band or other conveyer.

At the points of engagement of said subject-holder or carrier with the narrow supporting faces of the rack aforesaid I prefer that the contacts be with a wheel or pulley on each side of the said subject-holder or carrier, grooved or channeled in its face and each said wheel or pulley adapted to engage a member of said rack in such manner as to prevent any considerable amount of lateral motion to the said subject-holder or carrier while it is being so supported on said rack or and while moving thereon; the wheels or pulleys aforesaid also tending to facilitate the movements of the said subject-holders or carriers on the said rack.

Since a variable number of subject-holders or carriers in use in the device if allowed to exert posterior gravity pressure on the focused subject-holder or carrier as aforesaid will cause a variance in the load or burden put upon the source of power that actuates the device when in operation, I sometimes prefer to provide a latch-like attachment pivotally fastened to each member of said rack and in such relation that when in focused position the pressure of a projecting arm of said subject-holder or carrier will depress that portion of the latch-like device anterior to the said pivot point and raise its opposite extremity, causing, preferably, a wedge or chisel-like part at the posterior end of the said latch-like device to intervene at a predetermined point suited to arrest the forward movement of any subject-holders or carriers then on the said rack and located still farther posteriorly. The subject-holder or carrier in focused position is thus at all times when the device is in operation subjected to the pressure of no more than a predetermined number of subject-holders or carriers. As a subject-holder or carrier is lifted as aforesaid from its focused position a suitable conformation of the said subject-holder or carrier, at the proper time, engages the said latch-like device, raises it as the said subject-holder or carrier passes from its focused position, and, at the same time, depressing the wedge or chisel-like point at the opposite extremity of the said latch-like device, releases the subject-holders or carriers then to it posteriorly located on the said rack so that they can freely move forward and press into focused position the subject-holder or carrier then occupying the anterior position on the said rack. To give additional leverage to the said latch-like device I sometimes prefer to make a depression at the anterior end of the subject-holder or carrier supporting face of each member of said rack to removably seat the wheel or pulley with which the projecting arms of the said subject-holders or carriers are provided. My preferred means for elevating the anterior portion of the said latch-like device and at the same time depressing its posterior portion as a said subject-holder or carrier passes from a position for focused exposure to the projecting light rays, is by means of a laterally projecting attachment near the lower corner of each said subject-holder or carrier so shaped and placed that when being removed from said position for focused exposure to projecting light rays it will engage an inwardly projecting stud or pin on the anterior part of said latch-like device, remain in lifting contact with said stud or pin until said subject-holder or carrier passes completely from the said focused position, and then automatically become disengaged.

Another form of laterally projecting attachment for engaging the said inwardly projecting stud or pin on the anterior part of said latch-like device as aforesaid is pivotally attached near a lower corner of the said subject-holder or carrier and so positioned and shaped that when said subject-holder or carrier supported by the chains, belts, bands or other conveyers, in operative motion as heretofore described, begins its passage between the members of the aforesaid rack, contact with the face of said rack member will cause the said laterally projecting attachment to yield to the pressure of said rack face sufficiently to allow the said subject-holder or carrier to continue its passage between the said rack members, the said laterally projecting attachment as soon as it passes from contact with the said rack member by gravity, or otherwise, at once assuming its normal position of lateral projection. That each said subject-holder or carrier when posteriorly released on the said rack may take a quick initial free forward movement I prefer to give to the posterior extremity of the said subject-holder or carrier supporting face of each said rack member a sharp anterior pitch or inclination.

Another form of my invention for causing the said subject-holders or carriers to serially move into position for exposure to the projecting light rays as before described is to associate with each of two members of the rack aforesaid, preferably on the upper side, an endless movable part adapted to removably seat the supporting arms of each said subject-holder or carrier and advance each said subject-holder or carrier a predetermined distance at intervals coincident with the removal of any said subject-holder or carrier from a position for focused exposure to the projecting light rays as aforesaid, and, at a desired point in the operative course of said endless movable part, release one of said subject-holders or carriers for movement by gravity, or otherwise, into a position for focused exposure to the projecting light rays. My preferred method for imparting motion to each said endless movable part is by means of two sprocket wheels, a major and a minor, on a single shaft, the major sprocket wheel engaging the said chain, belt, band or other conveyer and the minor sprocket wheel, with a single sprocket, engaging at each revolution the said endless movable part, giving it movement when so engaged and leaving it at rest when disengaged. By this means the required intermittent motion can be given to the said endless movable part. An adjustment of the diameters of the said major and minor sprocket wheels to each other and to the length of said chain, belt, band or other conveyer, as well as to the desired forward movement of said endless movable part at each impulse, will insure the required operative synchronism between the different parts of the device concerned. Where the said endless movable part associated with one of the said rack members is in the form of an endless chain moving over supports the axis of each of which is horizontal to the plane of the device as a whole, I prefer to place the rearmost of the said supports posterior to the said minor sprocket wheel.

To facilitate the removal of said subject-holder or carrier from a focused position I prefer to provide rollers, or other friction reducing device, anteriorly placed relative to the said focused subject-holder or carrier and against which it may press while in focused position and while being removed therefrom.

As a provision for reducing any undesired slack, looseness or tightness that may develop in the said chains, belts, bands or other conveyers while in operative position on the said wheels or pulleys, sprocketed or otherwise, I preferably mount one of the said wheels or pulleys on each side of the said rack movably on a base, with set screw attachment, thus permitting any adjustment that the exigencies of operative service may demand.

The nature and scope of my present invention will be more fully understood from the following description taken in connection with the accompanying drawings, forming part hereof, in which—

Figure 1, is a view of a cross section through my device. Fig. 2, is a horizontal cross section on line 2—2 of Fig. 1. Fig. 3, is a detail of the driving mechanism on line 3—3 of Fig. 2. Fig. 4, is a perspective view showing detail of the supporting arms on the conveyer; also showing its engagement with the supporting arm on a subject-holder or carrier. Fig. 5, is a detail of the supporting arm on a subject-holder or carrier showing the wheel or roller in engagement on the rack. Figs. 6 and 7, are views of modified forms of engaging attachments on the conveyer. Fig. 8, is an enlarged view of the latch-like device in place on a rack member. Fig. 9, is a cross section on line 9—9 of Fig. 8. Fig. 10, is a view of a modified form of means on a subject-holder or carrier for tripping the latch-like device. Fig. 11, is a sectional view through a modified form of my device.

Referring to the drawings, $a$, represents the casing of the device, $a^1$ the source of projecting light rays, $a^2$ the aperture in the casing through which the projecting light rays reach the subject-bearing face of a subject-holder or carrier when in focused position, $a^3$ represents the conveyer, $a^4$ shows one of the conveyer pins or studs for engaging a projecting arm of the subject-holder or carrier, $a^5$ indicates the motor source of power for actuating the device, $a^6$ is the worm driven by the motor, $a^7$ indicates the gear train attached to the shaft $a^8$, operating the sprocket wheel $a^9$, which engages the conveyer $a^3$, $a^{10}$ are guide wheels or rollers, $a^{11}$ and $a^{12}$ are modified forms of $a^4$.

$b$ represents a member of the inclined rack, $b^1$ is a view of the acute and upward pointed posterior extremity of a rack member $b$.

$c$ represents a subject-holder or carrier, $c^1$ shows a wheel or roller on the projecting arm of a subject-holder or carrier $c$, $c^2$ shows the cup like form attached to a subject-holder or carrier, $c$, for engaging the projecting arm $a^4$, of the conveyer $a^3$; $c^3$ is a modified form of $c^2$.

$d$ is the latch-like device pivoted at $d^1$ to a bracket $d^2$, attached to the rack member $b$, $d^3$ is the wedge or chisel-shaped projection of $d$ for interposition to check the forward movement on the rack $b$ of subject-holders or carriers $c$; $d^4$ is a stud or pin projecting from the anterior part of the latch-like device, $d$, in line for engagement with the tripping device $d^5$, attached to the subject-holder or carrier, $c$; $d^6$ is a modified form of the tripping device, $d^5$.

$e$ represents friction reducing wheels or rollers positioned anteriorly to a subject-holder or carrier $c$ when in focused position.

In the modification shown in Fig. II, $f$ is a major sprocket wheel and $f^1$ a minor sprocket wheel; $f^2$ is the shaft on which a major and a minor sprocket wheel are mounted; $f^3$ shows an endless movable part running over the supporting rollers $f^4$, $f^5$ indicates seats for removably accommodating the projecting arms, $c^1$, of the subject-holders or carriers, $c$; $f^6$ represents one of the two members of an anteriorly inclined rack for causing a subject-holder or carrier, $c$, when released by $f^5$ to move by gravity into a position for focused exposure to the projecting light rays at $a^2$, the upward opening wedge-like pocket, $f^7$, being adapted to engage the lower edge of said subject-holder or carrier $c$, and insure its desired retention in place during exposure to the projecting light rays.

The operative action of my device as a whole is as follows: The motor, $a^5$, actuating the gear train attached to the shaft, $a^8$, causes the sprocket wheels, $a^9$, to move the conveyers, $a^3$, whose stud or pin projections, $a^4$, engage the projecting arms, $c^2$, of the subject-holder or carrier, $c$, in focused position to receive the projecting light rays from $a^1$, through the casing aperture, $a^2$, and lifting said subject-holder or carrier, $c$, the trip, $d^5$, engages the stud or pin, $d^4$, and raising the anterior end of the latch-like attachment, $d$, at the same time depressing its posterior chisel-like projection, $d^3$, by movement on the pivot, $d^1$, so that all of the subject-holders or carriers, $c$, then supported by the rack, $b$, and posterior to said chisel-like projection move forward and press the one anteriorly placed on the rack into focused position, its weight depressing the anterior end of the latch-like attachment $d$, and elevating its posterior end so that the chisel-like projections, $d^3$, are interposed to receive the pressure of all the said subject-holders or carriers then posteriorly positioned on the said rack; meantime the conveyers, $a^3$, proceeding with the subject-holder or carrier, $c$, take it past the guide rollers, $a^{10}$, until in their downward course the wheels or rollers, $c^1$, on the arms of the subject-holder or carrier, $c$, engage the rack, $b$, and, freed from engagement with the conveyer pins, $a^4$, are given a quick initial forward movement by the sharp anterior incline, $b^1$, and then advance by gravity until stopped by contact with another subject-holder or carrier, $c$, or with the interposed chisel-like projections, $d^3$, of the latch-like attachments, $d$.

Having thus described the nature and objects of my invention what I claim as new and desire to secure by Letters Patent is:—

1. With a picture projecting device the combination of endless conveyers adapted to engage at predetermined intervals subject-holders or carriers and remove them sequentially from a position for focused exposure to the projecting light rays to a posterior position and there disengage them, means for causing the subject-holders or carriers so disengaged to serially pass into focused position to receive the projecting light rays and means for imparting motion to said endless conveyers, substantially as and for the purposes described.

2. With a picture projecting device the combination of endless conveyers adapted to engage at predetermined intervals subject-holders or carriers and remove them sequentially from a position for focused exposure to the projecting light rays to a posterior position and there disengage them, means for causing the subject-holders or carriers so disengaged to serially pass into focused position to receive the projecting light rays, rollers or friction reducing means so shaped and placed as to confine the friction of removal to predetermined and restricted parts of the subject-holders or carriers and means for imparting motion to said endless conveyers, substantially as and for the purposes described.

3. With a picture projecting device the combination of endless conveyers adapted to engage at predetermined intervals subject-holders or carriers, remove them sequentially from a position for focused exposure to projecting light rays to a posterior position and there disengage them, means for imparting motion to said endless conveyers, a rack anteriorly inclined to support said subject-holders or carriers so disengaged or otherwise there placed, projecting arms on said subject-holders or carriers to engage said rack, flanged pulleys or wheels on said projecting arms to reduce friction and to limit lateral motion of said subject-holders or carriers while moving on said rack toward or into position for focused exposure to projecting light rays as aforesaid, and provision made on said projecting arms for completing the mutuality for engagement between the said subject-holders or carriers and the said endless conveyers while operatively united, substantially as and for the purposes described.

4. With a picture projecting device the combination of endless chains, belts or bands adapted to engage at predetermined intervals subject-holders or carriers and remove them sequentially from a position for focused exposure to the projecting light rays to a posterior position and there disengage them, a rack anteriorly inclined to support said subject-holders or carriers so disengaged, means for supporting said subject-holders or carriers on said rack and for completing the mutuality for engagement between the said subject-holders or carriers and the said endless chains, belts or bands, an acute downward inclination of the subject-holder or carrier supporting face at the posterior extremity of each member of said rack, sprocket wheels to produce synchronous movement of the said chains, belts or bands, guide or carrying wheels adjustably mounted to permit the easy, exact and desired reduction of looseness or tightness in the said chains, belts or bands when operatively in position and to further insure their synchronous movement throughout their entire circuit as aforesaid, and means for imparting motion to said endless chains, belts or bands, substantially as and for the purposes described.

5. With a picture projecting device the combination of endless conveyers adapted to engage at predetermined intervals subject-holders or carriers and remove them sequentially from a position for focused exposure to the projecting light rays to a posterior position and there disengage them, a rack anteriorly inclined to support said subject-holders or carriers so disengaged, means for supporting said subject-holders or carriers on said rack and for completing the mutuality for engagement between the said subject holders or carriers and the said endless conveyers, an acute downward inclination of the subject-holder or carrier supporting face at the posterior extremity of each member of said rack, a depression in the anterior end of each member of said rack, sprocket wheels to produce synchronous movement of the said endless conveyers, wheels adjustably mounted to permit the easy, exact and desired reduction of looseness or tightness in the said endless conveyers when in operative position and to further insure their synchronous movement throughout their entire circuit, and means for imparting motion to said endless conveyers substantially as and for the purposes described.

6. In a picture projecting device a rack of two or more members anteriorly inclined, a plurality of subject-holders or carriers adapted to engage said rack, to be supported by it and to move forward by gravity when released upon it, the foremost of said subject-holders or carriers, when the device is in operation, taking on said rack, for a predetermined interval of time, a position for focused exposure to the projecting light rays, means for automatically limiting and making uniform the number of said subject-holders or carriers that can at any time be exerting gravity pressure on any said subject-holder or carrier then in said focused position, substantially as and for the purposes described.

7. In a picture projecting device a rack of two or more members anteriorly inclined, a plurality of subject-holders or carriers adapted to engage said rack, to be supported by it and to move forward by gravity when released upon it, the foremost of said subject-holders or carriers, when the device is in operation, taking on said rack, for a predetermined interval of time, a position for focused exposure to the projecting light rays, arms pivotally attached to members of said rack and so positioned relative to the subject-holder or carrier supporting face of each said member that when one of the said subject-holders or carriers is in focused position for exposure to said projecting light rays its weight will cause the said arms to be depressed anteriorly and elevated posteriorly of its said pivotal attachment, said posterior elevation operating to interpose a check against the further forward movement on the said rack of any said subject-holders or carriers then posterior to the said check so interposed, the removal of the said subject-holder or carrier from its focused position as aforesaid permitting the anterior portion of each of the said attached arms to be elevated for a predetermined distance by engagement with a prepared portion of the said subject-holder or carrier, the posterior portion of said attached arm being at the same time depressed sufficiently to set free the said subject-holders or carriers held in check as aforesaid, substantially as and for the purposes described.

8. With a picture projecting device the combination of endless chains, belts or other means adapted to engage at predetermined intervals subject-holders or carriers and remove them sequentially from a position for focused exposure to the projecting light rays to a posterior position and there disengage them, a rack adapted to support said subject-holders or carriers so disengaged, endless movable parts associated with members of said rack, provision on said endless movable parts for removably seating the projecting arms of each said subject-holder or carrier, means for giving intermittent movement to said endless movable parts and means for automatically disengaging, when the device is in operation, any of said subject-holders or carriers at a point on its course with said endless movable parts adapted to cause it to pass into a position for focused exposure to the projecting light rays, substantially as and for the purposes described.

9. With a picture projecting device the combination of endless chains, belts or other means adapted to engage at predetermined intervals subject-holders or carriers and remove them sequentially from a position for focused exposure to the projecting light rays to a posterior position and there disengage them, a rack adapted to support said subject-holders or carriers so disengaged, endless movable parts associated with said rack, provision on said endless movable parts for removably seating the projecting arms of each said subject-holder or carrier, major sprocket wheels positioned to engage said endless chains, belts or other conveyer means, a minor sprocket wheel operating harmoniously with each said major sprocket wheel and adapted to engage said endless movable parts at predetermined intervals, imparting to said endless movable parts intermittent movement when the device is in operation, means for automatically disengaging any of said subject-holders or carriers at a point on its course with said endless movable parts adapted to cause it to pass into a position for focused exposure to the projecting light rays, and means for causing it to be releasably held in that position for the desired period of time, substantially as and for the purposes described.

In witness whereof, I have hereunto set my signature in the presence of the two subscribing witnesses.

MANLY M. GILLAM.

Witnesses:
 MORITZ WEIL,
 JAMES O. PALMER.